US012598077B2

(12) United States Patent (10) Patent No.: US 12,598,077 B2
Ringholm et al. (45) Date of Patent: Apr. 7, 2026

(54) DYNAMIC GENERATION OF DIGITAL CERTIFICATE REQUESTS

(71) Applicant: ZEBRA TECHNOLOGIES CORPORATION, Lincolnshire, IL (US)

(72) Inventors: Michael J. Ringholm, Coplay, PA (US); Blake E. Nemura, Saint Charles, IL (US); Vinod Govindaraju, Cumberland, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 227 days.

(21) Appl. No.: 17/951,514

(22) Filed: Sep. 23, 2022

(65) Prior Publication Data

US 2024/0106656 A1 Mar. 28, 2024

(51) Int. Cl.
*H04L 9/32* (2006.01)
(52) U.S. Cl.
CPC .......... *H04L 9/3247* (2013.01); *H04L 9/3265* (2013.01)
(58) Field of Classification Search
CPC .... H04L 9/3247; H04L 9/3265; H04L 9/3268
See application file for complete search history.

(56) References Cited

U.S. PATENT DOCUMENTS

| | | | | |
|---|---|---|---|---|
| 11,533,185 | B1 * | 12/2022 | Sharma | H04L 9/3263 |
| 11,563,590 | B1 * | 1/2023 | Bowen | H04L 9/3247 |

| | | | | |
|---|---|---|---|---|
| 2009/0031410 | A1 | 1/2009 | Schneider et al. | |
| 2019/0349357 | A1 | 11/2019 | Shukla et al. | |
| 2020/0153687 | A1 | 5/2020 | Ayyagari et al. | |
| 2021/0306161 | A1 * | 9/2021 | Medvinsky | E02B 3/122 |

FOREIGN PATENT DOCUMENTS

WO 20210245599 A1 12/2021

OTHER PUBLICATIONS

Gustavsson et al. The (updated) Definitive EJBCA Upgrade Guide. Feb. 18, 2019 (Feb. 18, 2019) [retrieved on Sep. 19, 2023]. Retrieved from the Internet <URL: https://ejbca2.rssing.com/chan-52431997/all_p4.html> entire document.
International Search Report and Written Opinion for International Application No. PCT/US2023/028219 mailed on Oct. 16, 2023.

* cited by examiner

*Primary Examiner* — Vu V Tran

(57) ABSTRACT

A method in a server, the method comprising: storing, in a memory of the server, a certificate signing request (CSR) input template comprising: (i) a dynamic first field definition including an attribute name, and (ii) a second field definition including a second field value; transmitting respective CSR instructions to a plurality of client devices, each instruction including the CSR input template; in response to transmitting the instructions, receiving, from each client device, a CSR comprising: (i) a first field value including an attribute value inserted by the client device in place of the attribute name, and (ii) the second field value; installing respective digital certificates at each of the client devices in response to receiving the CSRs.

16 Claims, 8 Drawing Sheets

104

300

Server 116 | Printer 104

305
Store CSR input template

310
Send CSR instruction

315
Receive CSR instruction

320
Retrieve attribute value(s)

325
Replace attribute name(s) with retrieved attribute value(s)

335
Receive CSR

330
Generate, send CSR

340
Obtain, install digital certificate

345
Receive, store digital certificate

600

116
Server

600

Generate CSR
Client ID: Site-A & <MAC>
Org. Name: ACME Inc.
Address: 123 Acme St.
Email: certadmin@acme.com

Generate CSR
Client ID: Site-A & <MAC>
Org. Name: ACME Inc.
Address: 123 Acme St.
Email: certadmin@acme.com

112
Network 104-1

104-2

DYNAMIC GENERATION OF DIGITAL CERTIFICATE REQUESTS

BACKGROUND

An environment such as a package-handling facility, manufacturing facility, or the like, may contain a number of client devices such as printers (e.g., label printers, or the like). While certain configuration data may be applied to the client devices from a central managing server, other configuration data is specific to each client device, and may therefore involve time-consuming manipulation of each client device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
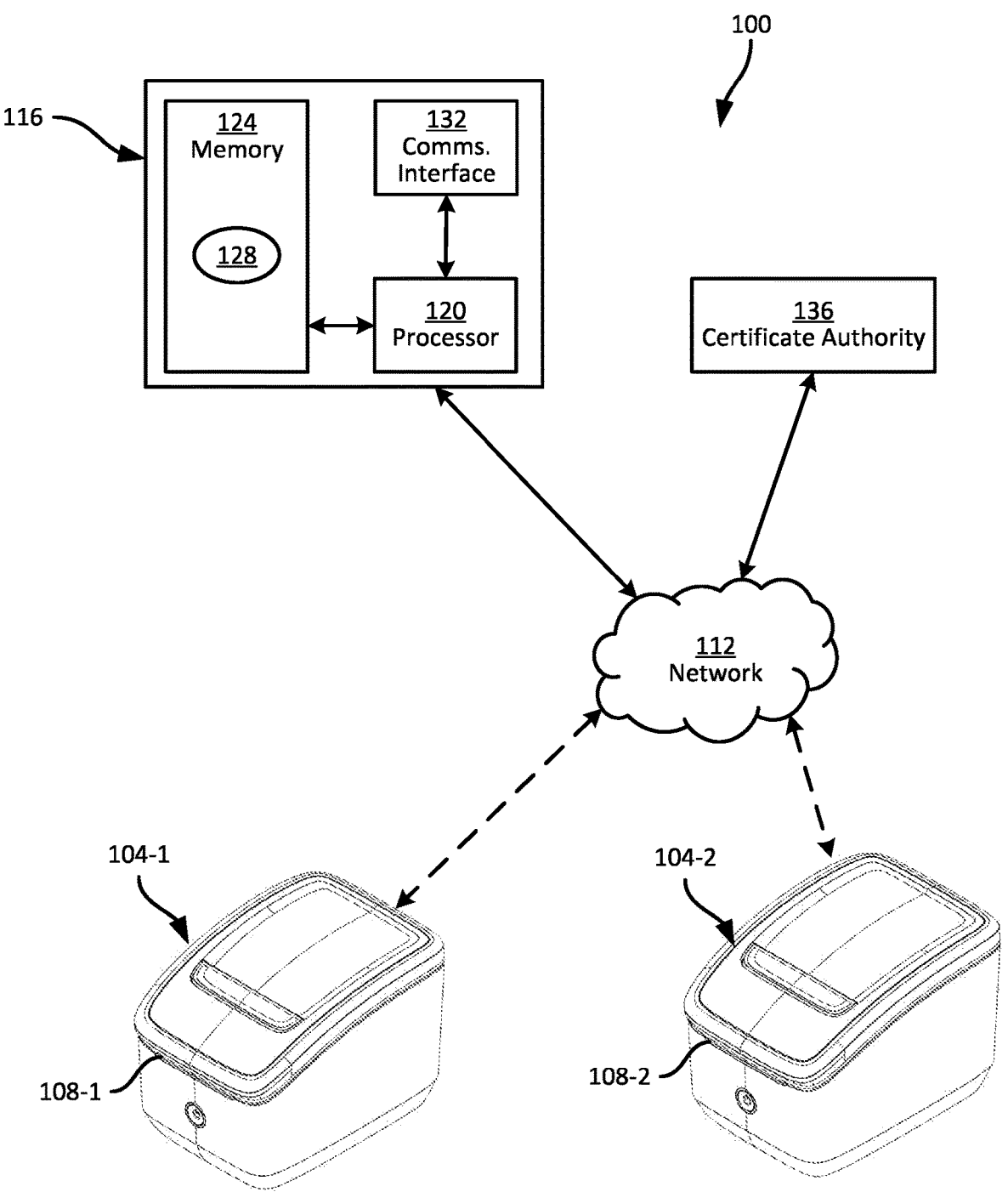
FIG. 1 is a diagram of a system for dynamic generation of digital certificate requests.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a server, the method comprising: storing, in a memory of the server, a certificate signing request (CSR) input template comprising: (i) a dynamic first field definition including an attribute name, and (ii) a second field definition including a second field value; transmitting respective CSR instructions to a plurality of client devices, each instruction based on the CSR input template; in response to transmitting the instructions, receiving, from each client device, a CSR comprising:

(i) a first field value including an attribute value inserted in place of the attribute name, and (ii) the second field value; installing respective digital certificates at each of the client devices in response to receiving the CSRs.

Additional examples disclosed herein are directed to a server, comprising: a memory storing a certificate signing request (CSR) input template comprising: (i) a dynamic first field definition including an attribute name, and (ii) a second field definition including a second field value; and a processor configured to: transmit respective CSR instructions to a plurality of client devices, each instruction based on the CSR input template; in response to transmitting the instructions, receive, from each client device, a certificate signing request (CSRs) comprising: (i) a first field value including an attribute value inserted in place of the attribute name, and (ii) the second field value; install respective digital certificates at each of the client devices in response to receiving the CSRs.

Further examples disclosed herein are directed to a method in a client computing device, the method comprising: receiving, from a server, an instruction to generate a certificate signing request (CSR), the instruction containing: (i) a dynamic first field definition including an attribute name, and (ii) a second field definition including a second field value; retrieving, from a local memory of the client computing device, an attribute value corresponding to the attribute name; replacing the attribute name in the dynamic first field definition with the retrieved attribute value, to generate a first field value; generating and sending the CSR containing the first field value and the second field value; and responsive to generating and sending the CSR, receiving and storing a digital certificate in the local memory.

Still further examples disclosed herein are directed to a client computing device, comprising: a communications interface; a memory; and a processor configured to: receive, from a server, an instruction to generate a certificate signing request (CSR), the instruction containing: (i) a dynamic first field definition including an attribute name, and (ii) a second field definition including a second field value; retrieve, from the memory, an attribute value corresponding to the attribute name; replace the attribute name in the dynamic first field definition with the retrieved attribute value, to generate a first field value; generate and send the CSR containing the first field value and the second field value; and responsive to generating and sending the CSR, receive and store a digital certificate in the memory.

FIG. 1 illustrates a system 100 for installing and/or updating digital certificates in client computing devices, such as printers or other media processing devices. The system 100 includes a plurality of client devices, including in the illustrated example a first printer 104-1 and a second printer 104-2 (collectively referred to as printers 104, and generically referred to as a printer 104; similar nomenclature is also used for other components herein). In the present example, the printers 104 are label printers, configured to apply indicia (e.g. via a thermal print head, although any of a variety of other impression technologies may be employed by the printers 104) to labels from a supply of labels housed within the respective bodies of the printers 104. Processed labels may be dispensed from outlets 108-1 and 108-2 of the printers 104. The system 100 can include a wide variety of other client devices aside from, or in addition to, the printers 104, and can also include a greater number of client devices than the two example printers 104 shown. Further, the fleet of client devices in the system 100 can include devices of different types, and/or having different operating attributes.

For example, the printers 104 can handle different media widths, use different impression technologies, or the like.

Control of the printers 104, e.g., to provide print commands to the printers 104, can be effected by providing local commands via operating interfaces (e.g., buttons, touch screens, or the like) of the printers 104. In other examples, control of the printers 104 can be effected by sending commands to the printers 104 via a network 112 (e.g., a suitable combination of local and wide-area networks, e.g., including a Wi-Fi network deployed within the facility housing the printers 104).

In addition to print command data (e.g., defining a print job for execution by a printer 104), configuration data may periodically be provided to, or collected from, one or more of the printers 104. Configuration data can include network settings, print settings (e.g., indicia intensity, and the like), and/or printer status (e.g., error codes, battery level, and the like). To deploy configuration data to the printers 104, and to collect configuration data from the printers 104, the system 100 includes a fleet management server 116 connected with the network 112. The server 116 can be configured to establish communication links with each printer 104 via the network 112 to facilitate the exchange of configuration data. In some examples, communication links between printers 104 and the server 104 can be initiated by each printer 104, e.g., by use of a uniform resource locator (URL) or other suitable network identifier stored at each printer 104 that corresponds to the server 116.

To secure the above-mentioned communication links with the printers 104, the server 116 can be configured to deploy digital certificates to the printers 104, and/or coordinate deployment of digital certificates to the printers 104. As will be apparent to those skilled in the art, a digital certificate installed at a printer 104 enables the printer 104 to establish encrypted connections with other computing devices, such as the server 116.

While some configuration data, such as print settings, network settings, or the like, can be deployed to a plurality of the printers 104 from the server 116, the installation of digital certificates at the printers 104 may involve the use of data uniquely identifying each printer. As a result, the deployment of digital certificates at the printers 104 may involve separate commands to each printer 104 from the server 116, and/or manual interaction with each printer 104. To mitigate the need for separate commands and manual interactions to deploy digital certificates to the printers 104, the server 116 and the printers 104 perform functionality to implement dynamic device identification for certificate signing requests (CSRs) in the system 100. As discussed below, the dynamic device identification functionality implemented in the system 100 enables the server 116 to send a common instruction to generate a CSR to multiple printers 104, and enables those printers 104 to generate unique CSRs based on dynamic manipulations of the common instruction.

FIG. 1 also illustrates certain internal components of the server 116. The server 116 includes a processor 120 (e.g. a central processing unit (CPU), graphics processing unit (GPU), or combination thereof), interconnected with a non-transitory computer readable storage medium, such as a memory 124. The memory 124 includes a suitable combination of volatile memory (e.g. Random Access Memory or RAM) and non-volatile memory (e.g. read only memory or ROM, Electrically Erasable Programmable Read Only Memory or EEPROM, flash memory). The processor 120 and the memory 124 each comprise one or more integrated circuits. The memory 124 stores computer readable instructions executable by the processor 120 to perform various functionality to exchange configuration data with the printers 104. In particular, the memory 124 stores a certificate management application 128 executable by the processor 120 to perform various actions discussed herein. The application 128 can be integrated, in some examples, with other fleet management functions performed by the server 116, such as updating print settings, collecting status data, and the like. The application 128 can therefore also be referred to as a printer profile manager application.

The server 116 also includes a communications interface 132 interconnected with the processor 120. The communications interface 132 includes suitable hardware (e.g. transmitters, receivers, network interface controllers and the like) allowing the server 116 to communicate with other computing devices—particularly the printers 104.

The system 100 can also include a certificate authority (CA) 136, which may be implemented as a distinct computing device from the server 116. The certificate authority 136 is configured to generate digital certificates for use by other devices, such as the printers 104. Such digital certificates authenticate the identities of the printers 104, facilitating the establishment of secure communications links, e.g., between the printers 104 and the server 116.

Figure 2:
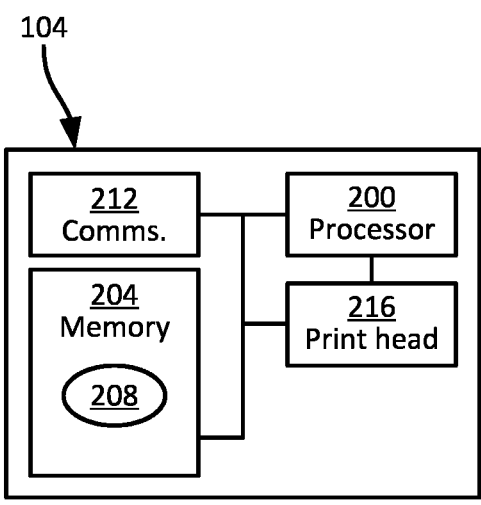
FIG. 2 is a diagram of certain internal components of a printer from the system of FIG. 1.

Turning to FIG. 2, certain internal components of an example printer 104 are shown. Each printer 104 in the system 100 includes those components, although the printers 104 can have distinct form factors, versions of each component, and the like.

The printer 104 as shown in FIG. 2 includes a processor 200 such as a central processing unit (CPU) and/or graphics processing unit (GPU), application-specific integrated circuit (ASIC), or the like, communicatively coupled with a non-transitory computer-readable storage medium such as a memory 204, e.g., a combination of volatile and non-volatile memory elements. The memory 204 stores a plurality of computer-readable instructions in the form of applications, including in the illustrated example a firmware application 208 whose execution by the processor 200 configures the printer 104 to perform various operations to execute print jobs, exchange configuration data with the server 116, and the like.

The printer 104 also includes a communications interface 212, enabling the printer 104 to establish connections with WLANs, such as the network 112 shown in FIG. 1. The communications interface 212 can therefore include any suitable combination of transceivers, antenna elements, and corresponding control hardware enabling communications with the networks 116.

The printer 104 also includes, in this example, a print head 216 controllable to apply indicia to media, e.g., from a supply housed within the printer 104. The print head 216 can include a thermal print head, e.g. with an array of independently controllable thermal elements to activate pigment in the media, and/or to transfer pigment from a ribbon within the housing 108 to the media. In other examples, the print head 216 can employ impression technologies other than thermal printing.

Figure 3:
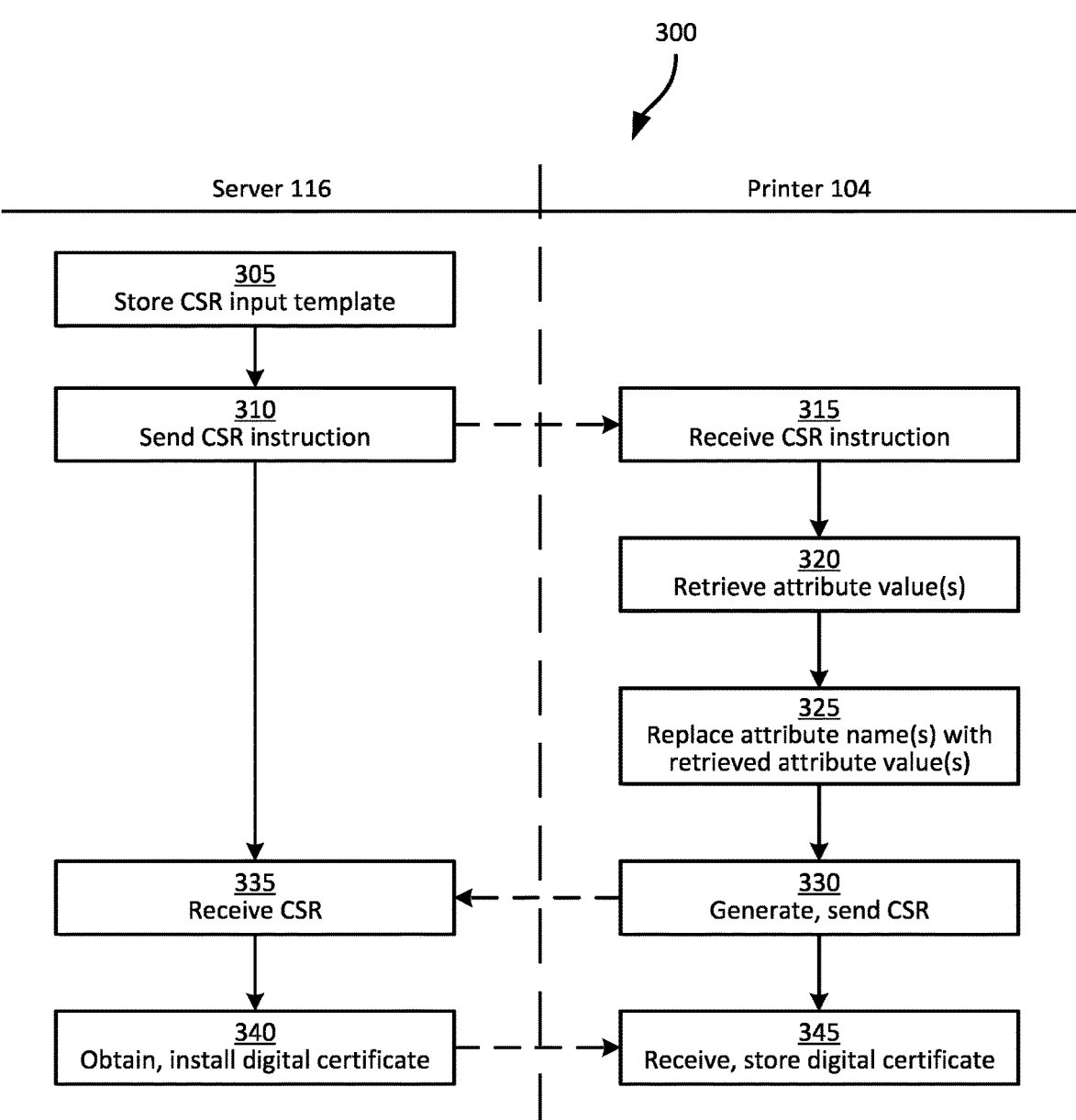
FIG. 3 is a flowchart of a method of dynamic generation of digital certificate requests.

Turning to FIG. 3, a method 300 of dynamically deploying digital certificates to client devices such as the printers 104 is illustrated. The method 300 is described below in conjunction with its example performance in the system 100. As indicated in FIG. 3, certain blocks of the method 300 are performed by the printers 104, while other blocks of the method 300 are performed by the server 116. In general, performance of the method 300 allows the server 116 to centrally coordinate the deployment of digital certificates unique to each of the printers 104.

At block 305, the server 116 is configured to store a digital certificate input template (also referred to herein simply as a template), e.g., in the memory 124. The template includes a set of field definitions employed by the printers 104 to generate CSRs in order to obtain digital certificates. Each field definition includes, for example a field name and information indicating how a corresponding field value is to be obtained. As will be apparent to those skilled in the art, a CSR can contain a number of field names and corresponding values to identify the entity seeking a digital certificate.

In the present example, at least one field definition of the template stored by the server 116 is dynamic, in that the template does not necessarily specify a static field value corresponding to the dynamic field name. The definition for the dynamic field contains an attribute name corresponding to an attribute of the printers 104. Each printer 104 can have a different attribute value corresponding to the attribute name, and to generate a CSR, each printer replaces any attribute names in the template with the corresponding attribute value. The same template can therefore be used to instruct multiple printers 104 to generate CSRs, and the resulting CSRs generated by the printers 104 contain different values as a result of the dynamic replacement of the above-mentioned attribute names.

Figure 4:
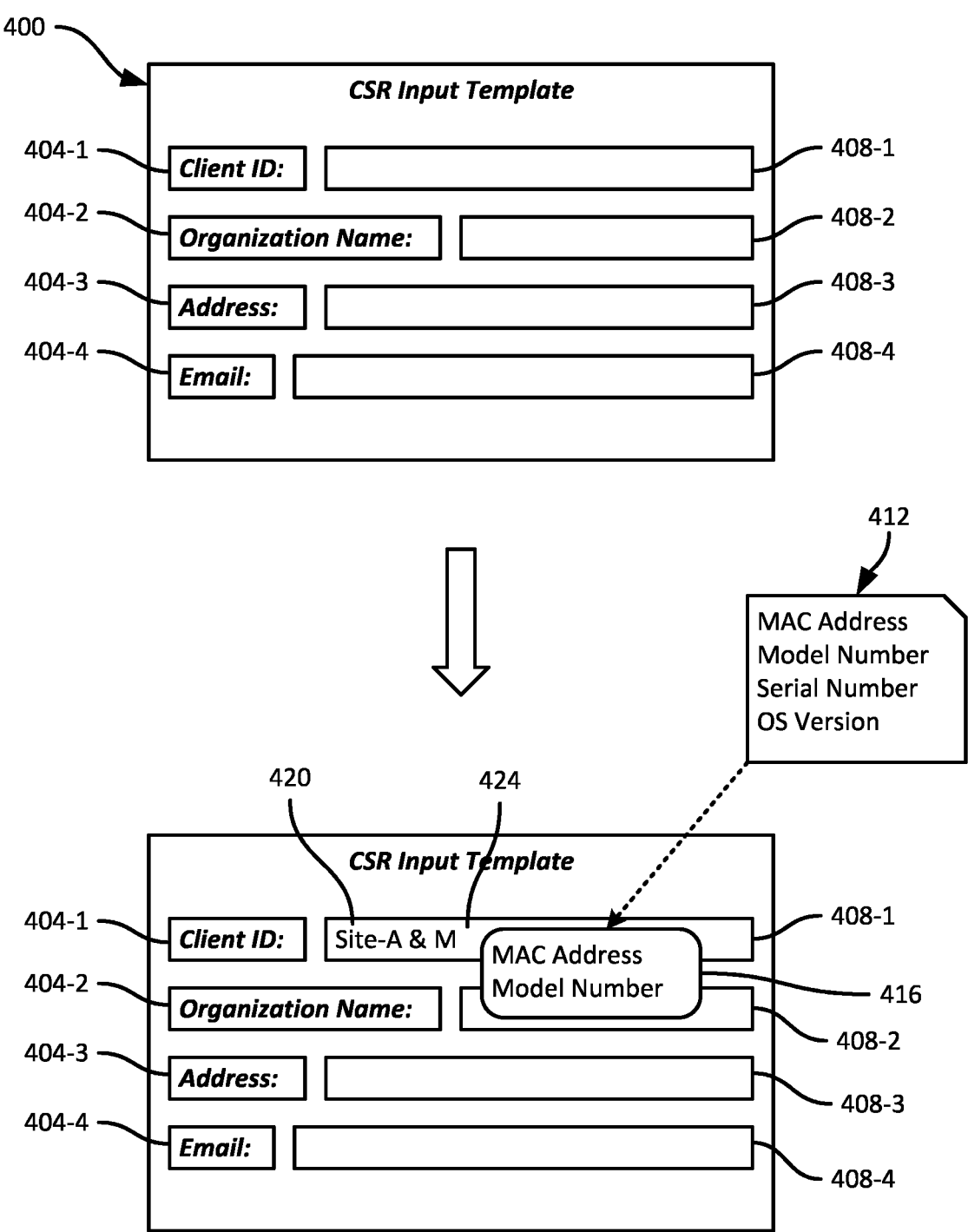
FIG. 4 is a diagram illustrating generation of a certificate signing request instruction template for use in the method of FIG. 3.

Prior to storage of the template at the server 116, the template can be created, e.g., by an operator of the server 116. The server 116 can be configured, for example, to present an interface (e.g., on a display connected with the server 116) containing a plurality of field names 404-1, 404-2, 404-3, and 404-4. FIG. 4 illustrates an example interface 400, including respective field names "Client ID" (e.g., a Subject Alternative Name (SAN) field), "Organization Name", "Address", and "Email". As will be apparent to those skilled in the art, the field names shown in the interface 400 correspond to values that may be included in a CSR.

The interface 400 also includes an input prompt 408-1, 408-2, 408-3, and 408-4 for each field name 404. The input prompt 408-1, in particular, can accept static characters, and can also accept attribute names for dynamic replacement at the printers 104. In the present example, the input prompts 408-2, 408-3, and 408-4 accept static input, but in other examples, more than one field can be dynamic.

To populate the input prompts 408, an operator of the server 116 can select (e.g., place focus on) a prompt 408, and provide input data via any suitable input device (e.g., a keyboard or the like). The server 116 can be configured, for dynamic field definitions such as the field name 404-1 and prompt 408-1, to monitor input data entered into the prompt 408-1 substantially in real-time, and to compare the input to a list 412 of printer attributes, e.g., stored in the memory 124. As seen in FIG. 4, the list 412 contains four attributes, including a media access control (MAC) address, a model number, a serial number, and an operating system (OS) version. Certain attributes (e.g., MAC address and serial number) may be unique to each printer 104, while other attributes (e.g., model number and OS version) may be shared between printers 104.

When the server 116 determines that a portion of the input data in the prompt 408-1 matches one or more attribute names from the list 412, the server 116 can render an overlay 416 containing the matching attribute name(s). The operator may then select one of the attribute names in the overlay to populate the attribute name in the prompt 408. Alternatively, the operator may continue entering input data. As will be apparent from FIG. 4, the prompt 408-1 can accommodate both static values (e.g., the string 420 "Site-A", which may be a name of the facility in which the printers 104 are deployed) and dynamic attribute names. In the illustrated example, the string 424 "M" matches the first character of two attribute names from the list 412 (MAC Address and Model Number). The two matching attribute names are therefore rendered in an overlay, and may be selected to auto-complete an attribute name in the prompt 408-1.

Figure 5:
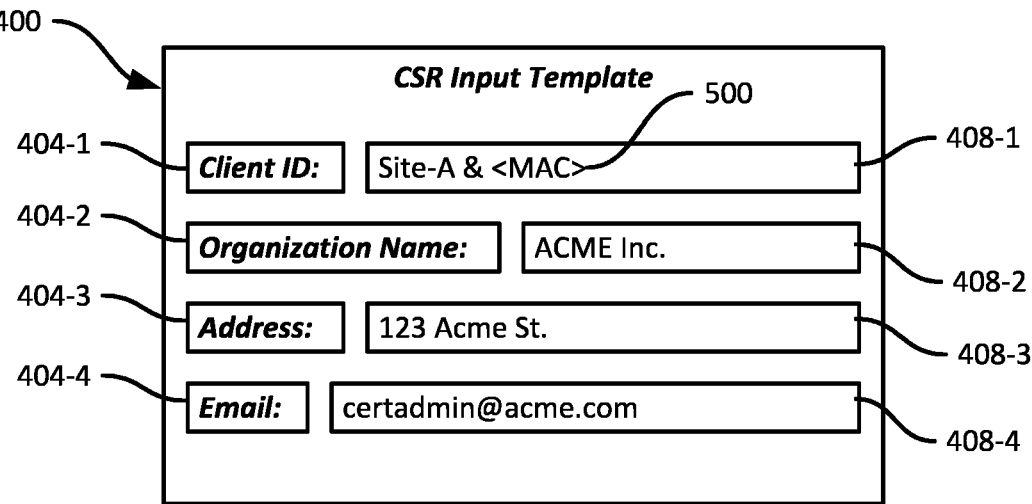
FIG. 5 is a diagram illustrating an example certificate signing request instruction template for use in the method of FIG. 3.

Turning to FIG. 5, the completed template is shown in the interface 400, with the above-mentioned static text as well as an attribute name 500 contained in the prompt 408-1. Operators can be employed to distinguish attribute names from static text, such as greater-than and less-than operators as shown in FIG. 5. In addition, separation operators (e.g., the ampersand shown in FIG. 5) can be used to separate components of a field value definition, as in the prompt 408-1. The remaining input prompts 408 are populated with static content in the example of FIG. 5.

Returning to FIG. 3, at block 310 the server 116 is configured to send a CSR instruction to at least a subset of the printers 104. For example, the server 116 can be configured to send the CSR instruction in response to a command received from the previously mentioned operator. The CSR instruction is an instruction to the printers 104 to generate and send a CSR, and contains the digital certificate input template. That is, the instruction includes the field names 404, and the field values defined in the input prompts 408, as set out in connection with FIGS. 4 and 5.

The subset of printers 104 to which a CSR instruction is sent at block 310 can be selected in various ways. For example, the server 116 can be configured to receive specific selections of individual printers 104, e.g., from an operator. In other examples, the server 116 can send the CSR instruction to every printer 104 in a physical facility, department, or the like. In further examples, the server 116 can send the CSR instruction to each printer 104 with a certain feature (e.g., an OS version supporting a particular certificate implementation).

Figure 6:
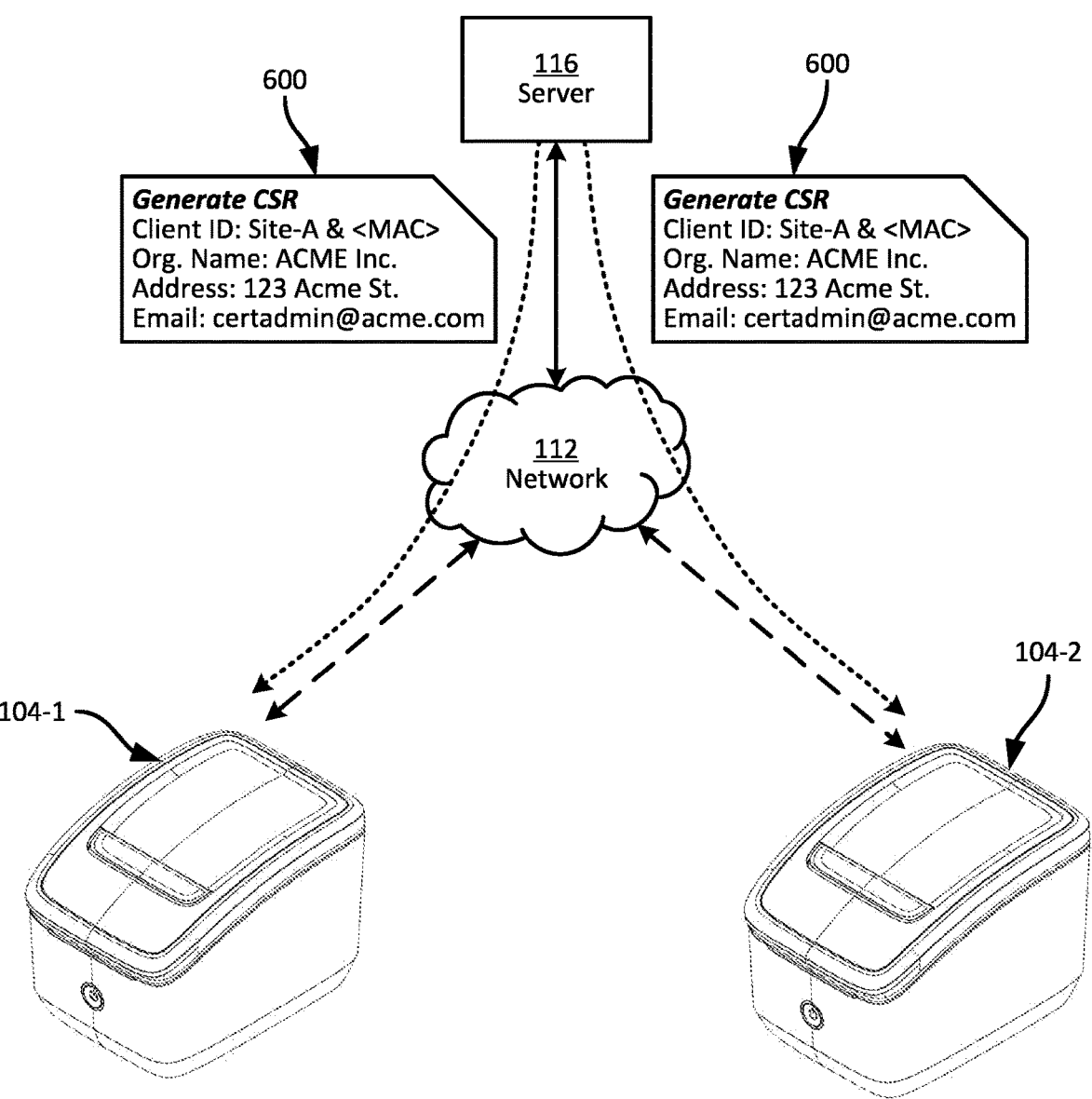
FIG. 6 is a diagram illustrating an example performance of blocks 310 and 315 of the method of FIG. 3.

FIG. 6 illustrates an example performance of block 310. In particular, the server 116 sends a CSR instruction to both printers 104. Although the CSR instructions are addressed to distinct printers 104, the content 600 of each CSR instruction is identical. The use of dynamic field definitions enables each printer 104 to generate a distinct CSR (i.e., having different content that the CSRs generated by other printers 104).

At block 315, each printer 104 is configured to receive the CSR instruction, e.g., via the network 112. At block 320, each printer 104 that received the CSR instruction is configured to identify any attribute names in the CSR instruction. When an attribute name is identified, such as the attribute name <MAC> shown in FIG. 5, the printer 104 is configured to retrieve, from the memory 204, the corresponding attribute value. Identifying attribute names in the CSR instruction can include inspecting the CSR instruction for the above-mentioned operators, such as greater-than or less-than operators. The CSR instruction can include a plurality of attribute names, which can be retrieved and concatenated to form a field value.

At block 325, having identified attribute names and retrieved corresponding attribute values from local memory 204 at block 320, the printer 104 is configured to replace the attribute name in the relevant field name definition of the CSR instruction with the corresponding attribute value retrieved at block 320.

At block 330, the printer 104 is then configured to generate and send a CSR containing a field value in place of the dynamic field value definition from the CSR instruction. The CSR also contains field values explicitly defined in the 7                                                   8

Figure 7:
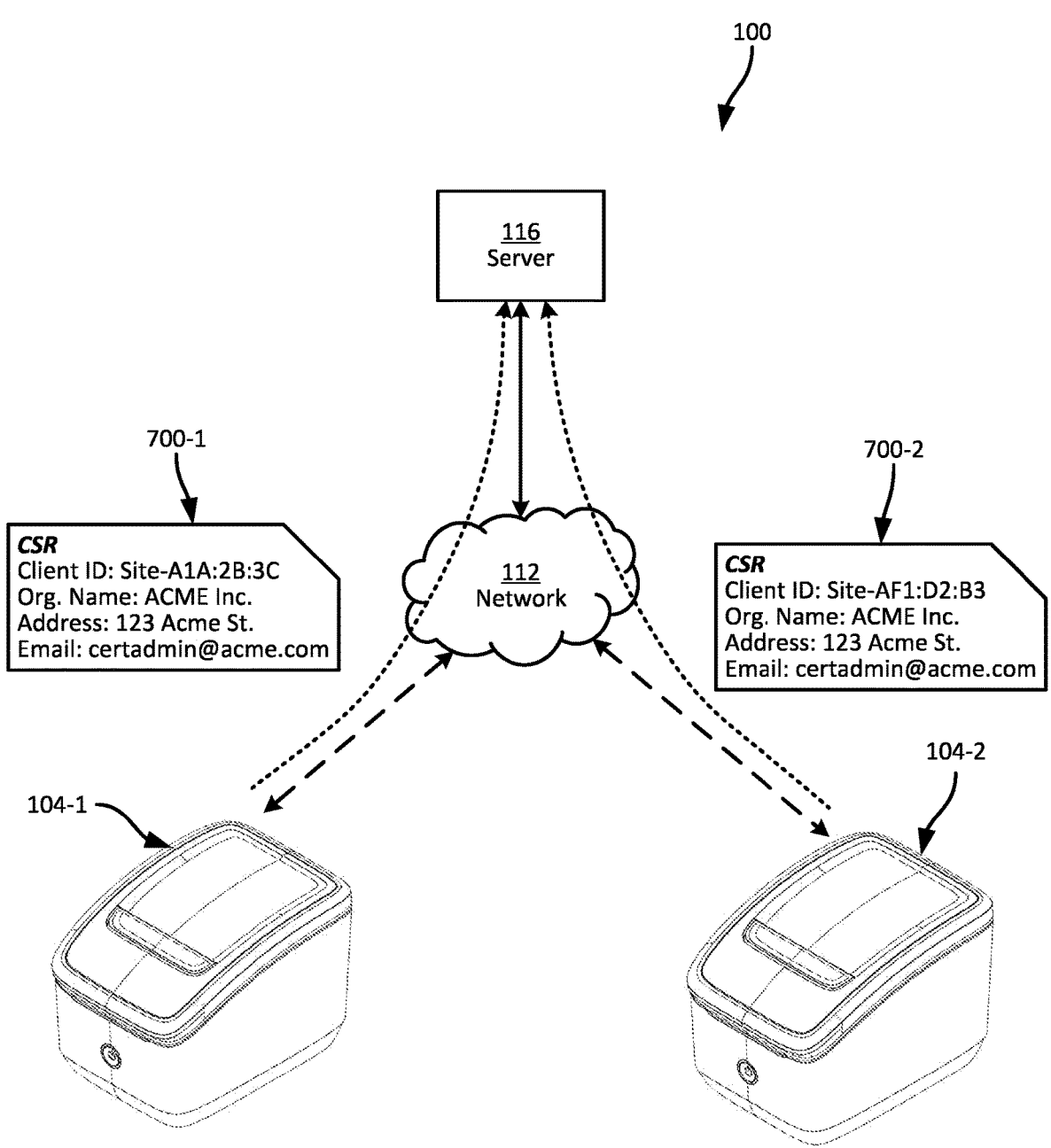
FIG. 7 is a diagram illustrating an example performance of blocks 320, 325, and 330 of the method of FIG. 3.

CSR instruction (e.g., the static values in the prompts 408-2, 408-3, and 408-4. Turning to FIG. 7, for example, the printers 104-1 and 104-2 are shown transmitting respective CSRs 700-1 and 700-2 to the server 116. The CSRs 700 both contain the same values for the fields "organization name", "address", and "email", as well as the same static value "Site-A" in the client identifier field. However, the client identifier fields in the CSRs 700 uniquely identify the respective printers 104, as the attribute name <MAC> has been replaced with a corresponding MAC address of each printer 104. In other words, by sending a common set of CSR instruction content 600 to more than one printer 104, the server 116 causes the printers 104 to generate distinct CSRs, which in turn enable the generation of distinct digital certificates for each printer 104.

As will be apparent, some or all of the contents of the CSRs 700 can be encrypted, e.g., with respective private encryption keys stored at the printers 104. Upon receipt of the CSRs 700 at block 335, the server 116 can be configured to obtain and install digital certificates at the printers 104, at block 340. Obtaining digital certificates can include forwarding the CSRs 700 to the CA 136, and receiving a distinct certificate for each printer 104 from the CA 136 in response. The certificates can then be transmitted to the printers 104 for storage in the memory 204, at block 345. In other examples, the printers 104 can transmit the CSRs 700 directly to the CA 136, in which case blocks 335 and 340 can be omitted. In such examples, the printers 104 proceed directly from block 330 to block 345, receiving the corresponding certificates from the CA 136 and storing in the memory 204.

In other examples, rather than transmitting a CSR instruction to each printer 104 containing the input template, the server 116 can be configured to obtain attribute values for each printer 104, and generate distinct CSR instructions for each printer 104. That is, the replacement of attribute names with attribute values in the CSR template can be performed by the server 116, rather than by the printers 104.

Figure 8:
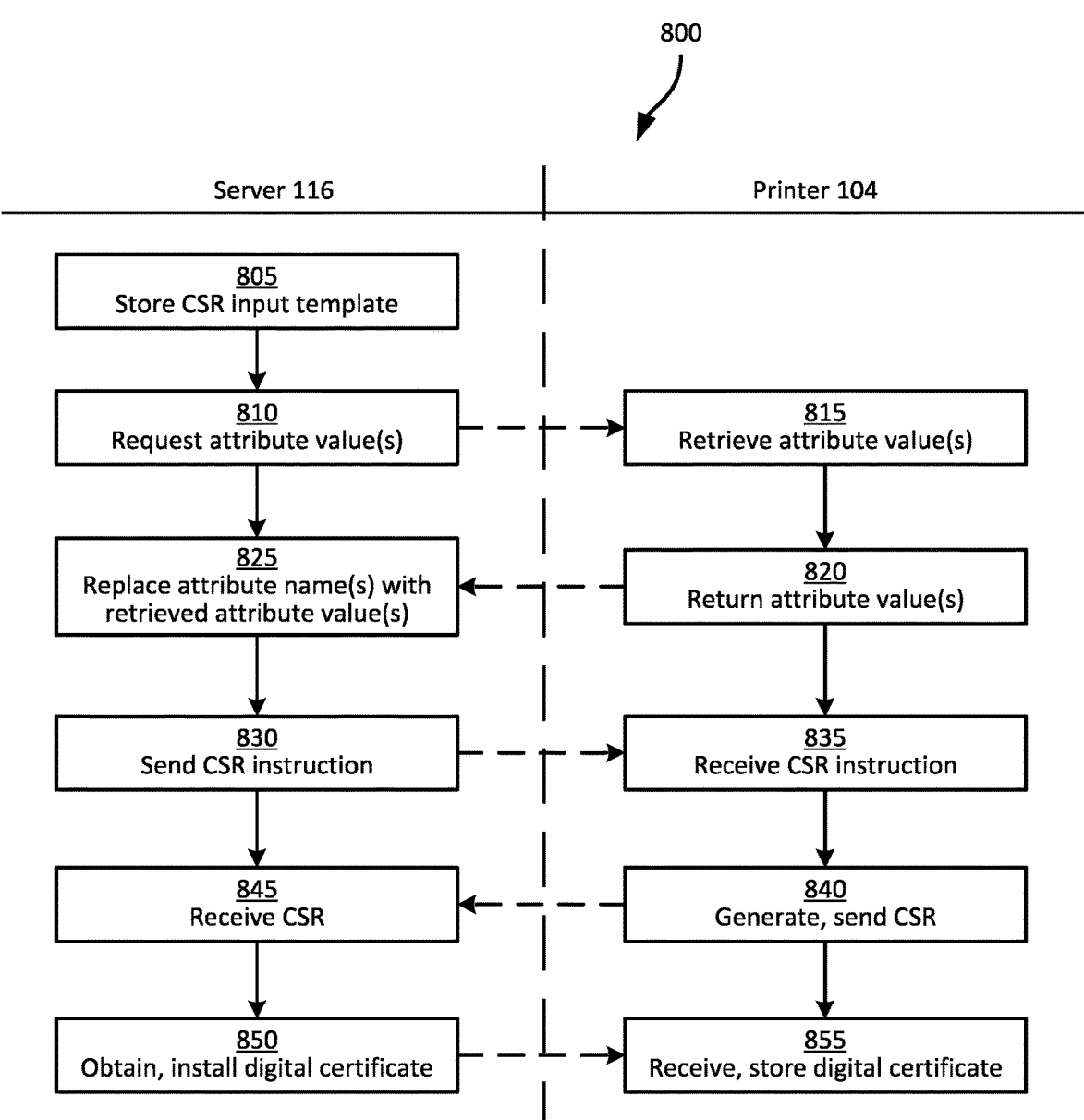
FIG. 8 is a flowchart of another method of dynamic generation of digital certificate requests.

FIG. 8 illustrates a method 800 of dynamically deploying digital certificates to client devices such as the printers 104, according to such examples. In the illustrated example, the server 116 is configured to store the CSR input template at block 805, as discussed above in connection with block 305. At block 810, the server 116 is configured to request the attribute values indicated in the CSR input template from the printers 104. That is, instead of sending the CSR input template to the printers 104, the server 116 is configured to identify any dynamic field definitions in the CSR input template, and to request the corresponding attribute values from each printer 104.

At block 815, the printer 104 (e.g., any printer 104 receiving a request generated by the server at block 810) receives the request and retrieves the relevant attribute values, as described above in connection with block 320. At block 820, the printer 104 returns the retrieved attribute values to the server 116.

At block 825, the server 116 is configured to generate client device-specific (e.g., printer-specific, in this example) CSR instructions in which the attribute names in dynamic field definitions with the retrieved attribute values received from printers 104. The replacement of attribute names with attribute values is otherwise as discussed above in connection with block 325.

At block 830, the server 116 is configured to send the above-mentioned client device-specific CSR instruction to the printer 104 (e.g., multiple distinct client device-specific CSR instructions to respective printers 104). The CSR instruction(s) sent at block 830 include static attribute values in place of the dynamic attribute names of the CSR input template.

At block 835, the printer 104 is configured to receive the CSR instruction. At block 840 the printer 104 is configured to generate and send a CSR based on the instruction received at block 835. As will be apparent, the printer 104 need not retrieve attribute values and insert those values into the CSR instruction in this example, as such insertion was already performed by the server 116.

At block 845, the server 116 is configured to receive the CSR, as described above in connection with block 335. At block 850, the server 116 is configured to obtain and install a digital certificate using the CSR, as described above in connection with block 340. At block 855, the printer 104 is configured to receive and store the digital certificate, as discussed above in connection with block 345.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a server, the method comprising:
storing a list of attribute names in memory of the server;
receiving input data corresponding to a dynamic first field;
selecting an attribute name from the list that matches the input data;
presenting, on a display, the attribute name selected by the server;
storing, in the memory of the server, a certificate signing request (CSR) input template comprising:
(i) the dynamic first field definition including the attribute name, and
(ii) a second field definition including a second field value;

transmitting a common set of CSR instructions to a plurality of client devices using the CSR input template;
in response to transmitting the instructions, receiving, device-specific CSRs from each client device, each of the device-specific CSRs comprising:
(i) a first field value including an attribute value specific to a corresponding client device of the plurality of client devices, the first field value is retrieved from memory of the corresponding client device in response to receipt of the common set of CSR instructions and is inserted in place of the attribute name by the corresponding client device, and
(ii) the second field value;
installing respective device-specific digital certificates at each of the client devices in response to receiving the CSRs.

2. The method of claim 1, wherein transmitting the CSR instructions includes, for each client device:
requesting the attribute value from the client device according to the CSR input template;
receiving the attribute value from the client device;
inserting the attribute value in place of the attribute name in a client device-specific CSR instruction; and
transmitting the client device-specific CSR instruction to the client device.

3. The method of claim 1, wherein the first field value is unique to each client device.

4. The method of claim 1, wherein installing the respective digital certificates includes:
forwarding the CSRs to a certificate authority (CA);
receiving respective certificates corresponding to each client device from the CA;
deploying the certificates to the client devices.

5. A server, comprising:
a memory storing a certificate signing request (CSR) input template comprising:
(i) a dynamic first field definition including an attribute name, and
(ii) a second field definition including a second field value; and
a processor configured to:
transmit a common set of CSR instructions to a plurality of client devices using the CSR input template;
in response to transmitting the instructions, receive, device-specific CSRs from each client device, each of the device-specific CSRs comprising:
(i) a first field value including an attribute value specific to a corresponding client device of the plurality of client devices, the first field value is retrieved from memory of the corresponding client device in response to receipt of the common set of CSR instructions and is inserted in place of the attribute name by the corresponding client device, and
(ii) the second field value;
install respective device-specific digital certificates at each of the client devices in response to receiving the CSRs,
wherein the processor is further configured, prior to storing the CSR input template, to:
store a list of attribute names in the memory;
receive input data corresponding to the dynamic first field;
select an attribute name from the list that matches the input data; and
present the selected attribute name on a display.

6. The server of claim 5, wherein the processor is configured to send the CSR instruction by, for each client device:

requesting the attribute value from the client device according to the CSR input template;

receiving the attribute value from the client device;

inserting the attribute value in place of the attribute name in a client device-specific CSR instruction; and transmitting the client device-specific CSR instruction to the client device.

7. The server of claim 5, wherein the first field value is unique to each client device.

8. The server of claim 5, wherein the processor is configured to install the respective digital certificates by:

forwarding the CSRs to a certificate authority (CA);

receiving respective certificates corresponding to each client device from the CA;

deploying the certificates to the client devices.

9. A method in a client computing device, the method comprising:

receiving, from a server, a common set of instructions to generate a certificate signing request (CSR), the common set of instructions being sent to a plurality of client devices and containing:

(i) a dynamic first field definition including an attribute name, and (ii) a second field definition including a second field value;

retrieving, by a processor of the client computing device without user intervention, a device-specific attribute value corresponding to the attribute name from a local memory of the client computing device in response to receipt of the common set of instructions;

replacing, by the processor of the client computing device without user intervention, the attribute name in the dynamic first field definition with the retrieved device-specific attribute value, to generate a first field value;

generating and sending the CSR containing the first field value and the second field value; and responsive to generating and sending the CSR, receiving and storing a device-specific digital certificate in the local memory.

10. The method of claim 9, wherein the client computing device includes a printer.

11. The method of claim 9, wherein the first field value uniquely identifies the client computing device.

12. The method of claim 9, wherein the dynamic first field definition includes a plurality of attribute names; and wherein the method includes retrieving, from local memory, a plurality of corresponding attribute values, and concatenating the attribute values to generate the first field value.

13. A client computing device, comprising:

a communications interface;

a memory; and a processor configured to:

receive, from a server, a common set of instructions to generate a certificate signing request (CSR), the common set of instructions being sent to a plurality of client devices and containing:

(i) a dynamic first field definition including an attribute name, and (ii) a second field definition including a second field value;

retrieve, by the processor of the client computing device without user intervention, a device-specific attribute value corresponding to the attribute name from the memory;

replace, by the processor of the client computing device without user intervention, the attribute name in the dynamic first field definition with the retrieved device-specific attribute value, to generate a first field value;

generate and send the CSR containing the first field value and the second field value; and responsive to generating and sending the CSR, receive and store a device-specific digital certificate in the memory.

14. The client computing device of claim 13, wherein the client computing device includes a printer.

15. The client computing device of claim 13, wherein the first field value uniquely identifies the client computing device.

16. The client computing device of claim 13, wherein the dynamic first field definition includes a plurality of attribute names; and wherein the method includes retrieving, from local memory, a plurality of corresponding attribute values, and concatenating the attribute values to generate the first field value.

* * * * *